US011763132B2

(12) United States Patent
Lev et al.

(10) Patent No.: US 11,763,132 B2
(45) Date of Patent: Sep. 19, 2023

(54) DETECTING NON-ANOMALOUS AND ANOMALOUS SEQUENCES OF COMPUTER-EXECUTED OPERATIONS

(71) Applicant: International Business Machines Corporation, Armonk, NY (US)

(72) Inventors: Guy Lev, Tel Aviv (IL); Boris Rozenberg, Ramat-Gan (IL); Yehoshua Sagron, Haifa (IL)

(73) Assignee: International Business Machines Corporation, Armonk, NY (US)

(*) Notice: Subject to any disclaimer, the term of this patent is extended or adjusted under 35 U.S.C. 154(b) by 1135 days.

(21) Appl. No.: 16/436,952

(22) Filed: Jun. 11, 2019

(65) Prior Publication Data

US 2020/0394496 A1 Dec. 17, 2020

(51) Int. Cl.
*G06N 3/044* (2023.01)
*G06N 3/084* (2023.01)

(52) U.S. Cl.
CPC ............. *G06N 3/044* (2023.01); *G06N 3/084* (2013.01); *G06F 2218/00* (2023.01)

(58) Field of Classification Search
CPC ............................... G06N 3/044; G06N 3/084
See application file for complete search history.

(56) References Cited

U.S. PATENT DOCUMENTS

| 8,332,944 B2 * | 12/2012 | Rozenberg | G06F 21/552 |
| | | | 713/188 |
| 2006/0041902 A1 * | 2/2006 | Zigmond | H04N 7/17336 |
| | | | 725/9 |

(Continued)

FOREIGN PATENT DOCUMENTS

| CN | 108898015 | | 11/2018 | | |
| CN | 108898015 A | * | 11/2018 | ........... | G06F 21/566 |

OTHER PUBLICATIONS

Landsiedel et al., "Syllabification of Conversational Speech Using Bidirectional Long-Short-Term Memory Neural Networks", 2011, 2011 IEEE International Conference on Acoustics, Speech and Signal Processing (ICASSP), pp. 5256-5259 (Year: 2011).*

(Continued)

*Primary Examiner* — Abdullah Al Kawsar
*Assistant Examiner* — Asher H. Jablon
(74) *Attorney, Agent, or Firm* — Dvir Gassner (57) ABSTRACT

Detecting sequences of computer-executed operations, including training a BLSTM to determine forward and backward probabilities of encountering each computer-executed operations within a training set of consecutive computer-executed operations in forward and backward execution directions of the operations, and identifying reference sequences of operations within the training set where for each given one of the sequences the forward probability of encountering a first computer-executed operation in the given sequence is below a predefined lower threshold, the forward probability of encountering a last computer-executed operation in the given sequence is above a predefined upper threshold, the backward probability of encountering the last computer-executed operation in the given sequence is below the predefined lower threshold, and the backward probability of encountering the first computer-executed operation in the given sequence is above the predefined upper threshold, and where the predefined lower threshold is below the predefined upper threshold.

17 Claims, 5 Drawing Sheets

(56) References Cited

U.S. PATENT DOCUMENTS

2009/0275849 A1* 11/2009 Stewart ............. A61B 5/02405
                                                                600/518
2018/0285740 A1    10/2018 Smyth et al.
2020/0296134 A1*   9/2020  Sreedhar ............... G06N 3/044

OTHER PUBLICATIONS

Li et al., "Converting Unstructured System Logs into Structured Event List for Anomaly Detection", 2018, ARES 2018: Proceedings of the 13th International Conference on Availability, Reliability and Security, 10 pages (Year: 2018).*

Rhodea,et al. Early-Stage Malware Prediction Using Recurrent Neural Networks. School of Computer Science and Informatics, Cardi University Airbus Group. arXiv:1708.03513v3 [cs.CR] Jun. 18, 2018. pp. 1-29.

Thi et al. One-class Collective Anomaly Detection based on LSTM-RNNs. Institute of Electronic, Institute of Military Science and Technology, Vietnam. 2 University College Dublin, Dublin, Ireland ngadtvt@gmail.com,loi.cao@ucdconnect.iean.lekhac@ucd.ie.

* cited by examiner

DETECTING NON-ANOMALOUS AND ANOMALOUS SEQUENCES OF COMPUTER-EXECUTED OPERATIONS

BACKGROUND

Computer-executed operations typically occur as a part of domain-dependent sequences of computer operations, such as related to business processes or workflows or operating system functions. For example, in a database domain, a series of SQL queries may be related to a "Money Transfer" business process. Such sequences of operations are often repeated during normal computer operations and may be understood to represent the legitimate flow of computer operations. When a computer system is compromised, such as by an attacker, the legitimate flow of computer operations is often tainted with anomalous, and often illegitimate, operations or sequences of operations.

SUMMARY

In one aspect of the invention a method is provided for detecting sequences of computer-executed operations, the method including training a bidirectional long short-term memory recurrent neural network to determine probabilities of encountering each of a plurality of consecutive computer-executed operations within a training set of consecutive computer-executed operations, where for each of the computer-executed operations the probabilities include a forward probability of encountering the computer-executed operation in a forward execution direction of the consecutive computer-executed operations, and a backward probability of encountering the computer-executed operation in a backward execution direction of the consecutive computer-executed operations, and identifying, using any of the forward probabilities and any of the backward probabilities, a plurality of reference sequences of consecutive computer-executed operations within the training set of consecutive computer-executed operations, where for each given one of the sequences the forward probability of encountering a first computer-executed operation in the given sequence is below a predefined lower threshold, the forward probability of encountering a last computer-executed operation in the given sequence is above a predefined upper threshold, the backward probability of encountering the last computer-executed operation in the given sequence is below the predefined lower threshold, and the backward probability of encountering the first computer-executed operation in the given sequence is above the predefined upper threshold, and where the predefined lower threshold is below the predefined upper threshold.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
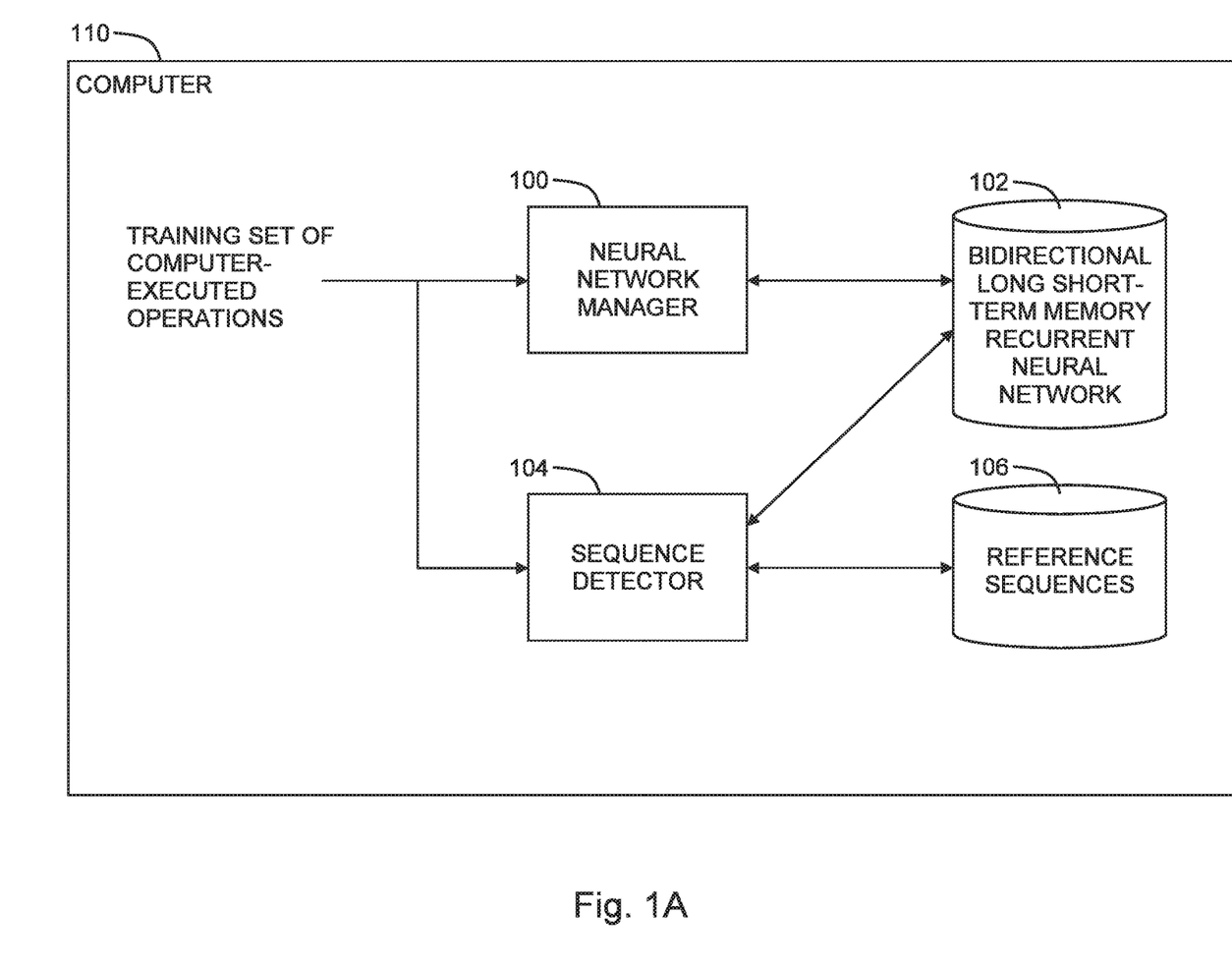
FIGS. 1A and 1B, taken together, is a simplified conceptual illustration of a system for detecting anomalous sequences of computer-executed operations, constructed and operative in accordance with an embodiment of the invention.
Figure 1B:
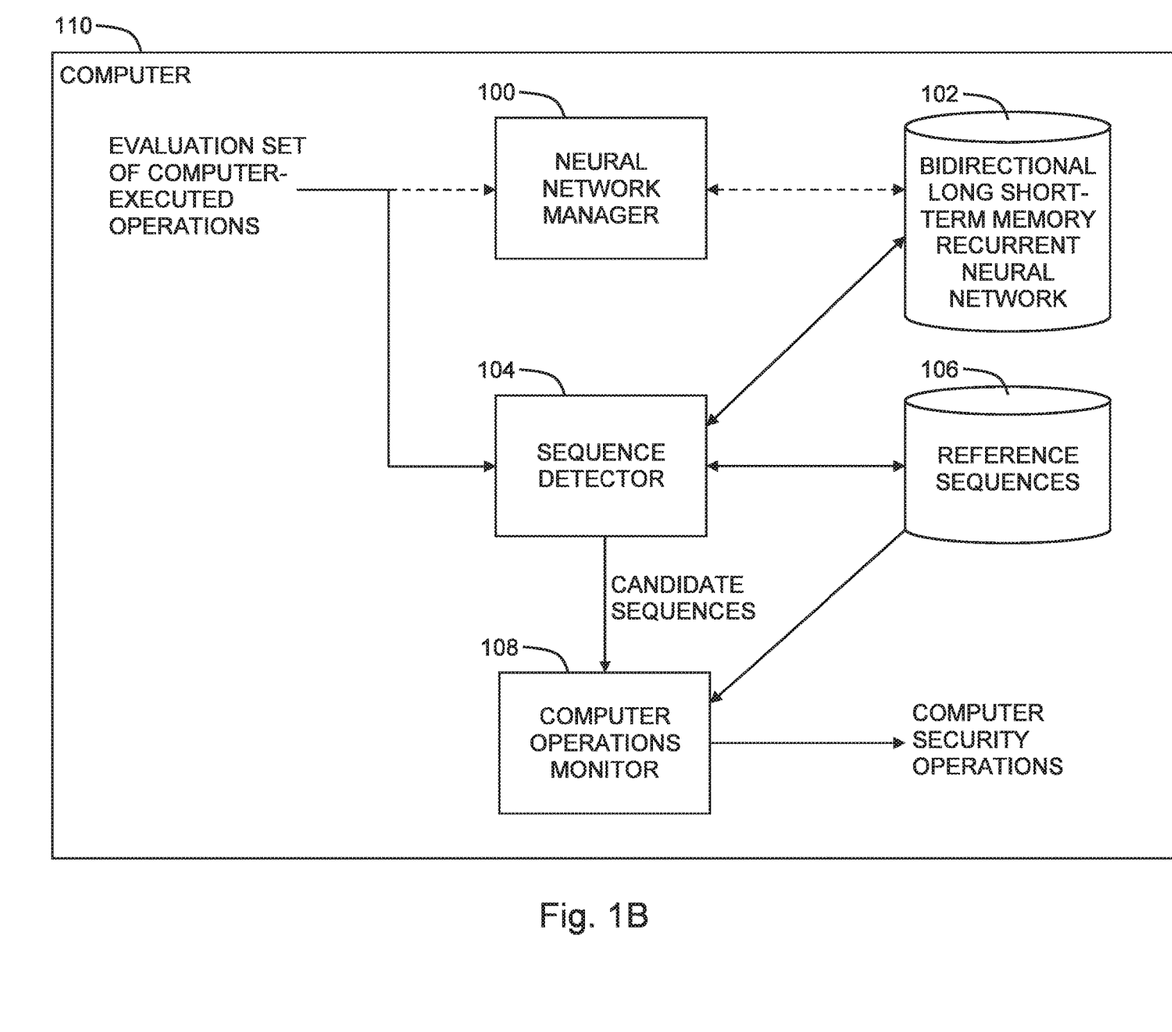

Reference is now made to FIGS. 1A and 1B, which, taken together, is a simplified conceptual illustration of a system for detecting anomalous sequences of computer-executed operations, constructed and operative in accordance with an embodiment of the invention. In the system of FIG. 1A a neural network manager 100 is configured to train a bidirectional long short-term memory recurrent neural network, now referred to as BLSTM 102, using a training set of consecutive computer-executed operations. Each training set of consecutive computer-executed operations includes a time-ordered stream of consecutive computer-executed operations preferably performed with respect to a given computing perspective, non-limiting examples of which include where a given training set is of consecutive computer-executed operations performed by a given computer software application on a given computer, or of consecutive computer-executed operations performed on a given data store on a file server, such as a text file or database, or of consecutive computer-executed operations performed by a computer in support of its interactions with one or more other computers. The computer-executed operations themselves may be defined at any level of granularity using any conventional technique and may include any known type of computer-executed operation, non-limiting examples of which include database queries, file reads, file writes, and HTTP GET operations.

BLSTM 102 processes the consecutive computer-executed operations in the training set in both a forward execution direction, where the training set's computer-executed operations are processed in the order of their execution, as well as in a backward execution direction, where the training set's computer-executed operations are processed in the reverse order of their execution. BLSTM 102 processes each computer-executed operation in the training set by determining one probability $P_F$ of encountering the computer-executed operation in the forward execution direction in view of the computer-executed operations executed prior to execution of the computer-executed operation being processed, one probability $P_B$ of encountering the computer-executed operation in the backward execution direction in view if the computer-executed operations executed subsequent to execution of the computer-executed operation being processed, and one probability $P_{FINAL}$ of encountering the computer-executed operation in both forward and backward execution directions in view of the computer-executed operations executed both prior to and subsequent to the given computer-executed operation. $P_F$, $P_B$, and $P_{FINAL}$ are preferably calculated in accordance with conventional BLSTM techniques. In accordance with the invention, BLSTM 102, calculates three errors, one for $P_F$, one for $P_B$, and one for $P_{FINAL}$, and then applies any conventional backpropagation technique to update its network weights accordingly to minimize the three errors. BLSTM 102 is preferably trained by processing the training set one or more times in the manner described above until there is no improvement in the errors. Also in accordance with the invention, BLSTM 102 outputs, or otherwise makes available, $P_F$, $P_B$, and $P_{FINAL}$ for further processing as described hereinbelow.

Given the various probabilities determined in the course of training BLSTM 102, a sequence detector 104 is configured to identify sequences of two or more consecutive computer-executed operations within the training set of consecutive computer-executed operations. Each identified sequence of consecutive computer-executed operations represents computer-executed operations that are performed as a unit, typically multiple times in the course of normal computer operations with respect to a given computing perspective, much like a sequence of letters forms a unit that represents a word in a language, where the word is used multiple times during spoken or written communications. Thus, for example, such a sequence may be represented by the consecutive computer-executed operations of a web browser accessing a web page, followed by text being entered into a field within the web page labeled "Login," followed by text being entered into a field within the web page labeled "Password," and then followed by a button within the web page labeled "Sign in" being pressed. The sequences of consecutive computer-executed operations that are identified by sequence detector 104 are referred to herein as reference sequences 106.

Sequence detector 104 identifies each sequence of computer-executed operations within the training set where sequence detector 104 determines that the following criteria are met:
- the probability $P_F$ of encountering the first computer-executed operation in the sequence in the forward execution direction of the set is below a predefined lower threshold $T_L$,
- the probability $P_F$ of encountering the last computer-executed operation in the sequence in the forward execution direction of the set is above a predefined upper threshold $T_U$,
- the probability $P_B$ of encountering the last computer-executed operation in the sequence in the backward execution direction of the set is below the lower threshold $T_L$, and
- the probability $P_B$ of encountering the first computer-executed operation in the sequence in the backward execution direction of the set is above the upper threshold $T_U$, where $T_L < T_U$ for any desired $T_L$ and $T_U$.

The method used by sequence detector 104 to identify sequences of consecutive computer-executed operations within a set of consecutive computer-executed operations may be illustrated by way of the following example in which a portion of a set of consecutive computer-executed operations is represented as

. . . KDUNYGLINUYVSOIUYHTCOMP-SIEHGVSHRGINDCSTHMGLIJ . . .

where each of the letters in the portion shown represents a computer-executed operation, and where execution of the first computer-executed operation in the set portion shown, K, is followed by execution of the next computer-executed operation in the set portion shown, D, and so on until the last computer-executed operation in the set portion shown, J, is executed. In this example, sequence detector 104 identifies the following sequences within the set portion shown:

. . . KDUNY GLI NUYVSOIU YHTC OMP SIEHG VSHRGIN DCSTHM GLIJ . . .

Thus, for example, given a lower threshold value of $T_L=0.1$ that is below an upper threshold value of $T_U=0.9$, the sequence YHTC is identified as where:
- the probability $P_F$ of encountering the first computer-executed operation in the sequence, Y, in the forward execution direction of the set is below $T_L$ given the computer-executed operations executed prior to execution of Y,
- the probability $P_F$ of encountering the last computer-executed operation in the sequence, C, in the forward execution direction of the set is above $T_U$ given the computer-executed operations executed prior to execution of C,
- the probability $P_B$ of encountering the last computer-executed operation in the sequence, C, in the backward execution direction of the set is below $T_L$ given the computer-executed operations executed subsequent to execution of C, and
- the probability $P_B$ of encountering the first computer-executed operation in the sequence, Y, in the backward execution direction of the set is above $T_U$ the computer-executed operations executed subsequent to execution of Y.

Figure 1C:
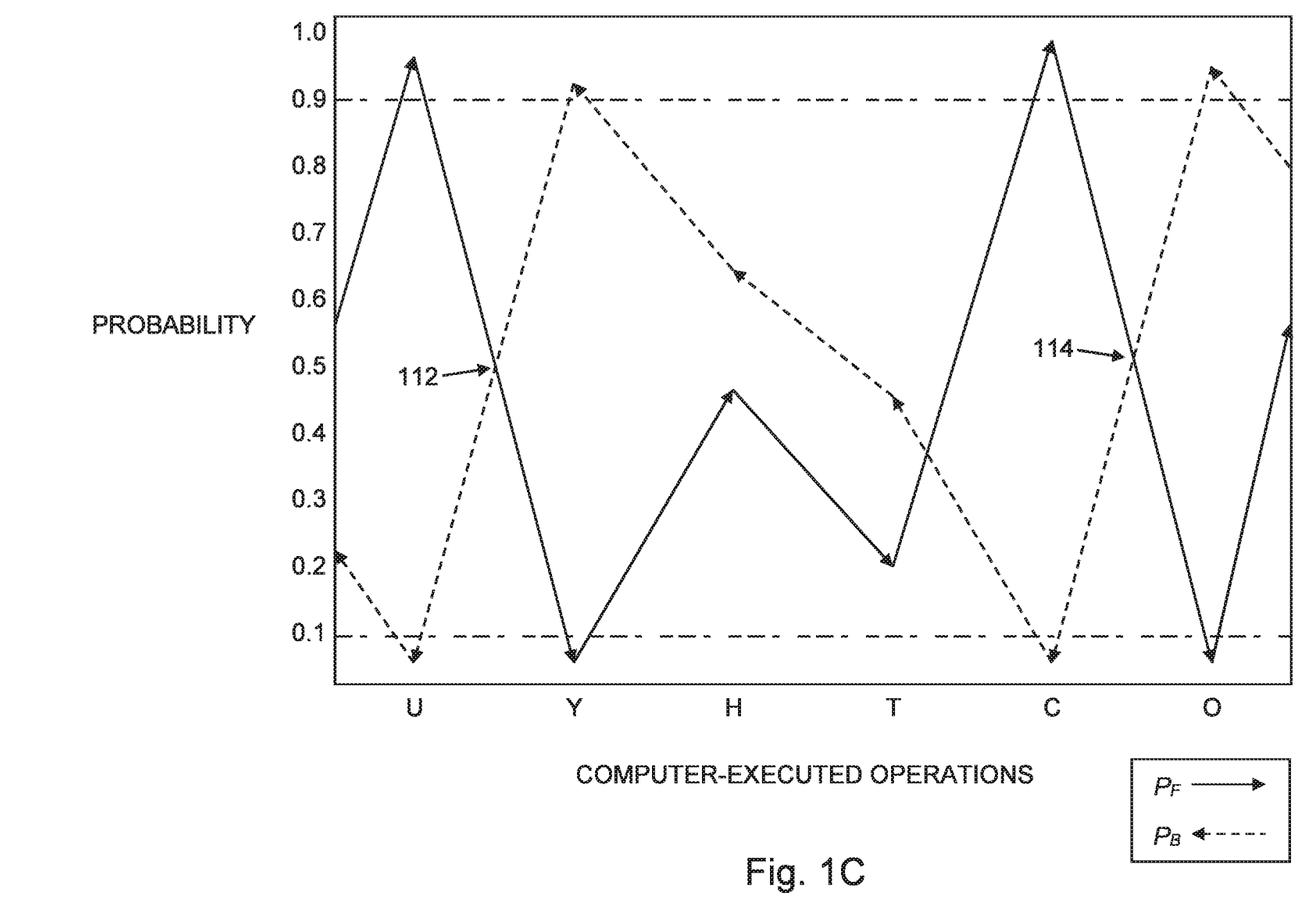
FIG. 1C is a simplified graphical illustration of a sequence of computer-executed operations identified using the system of FIGS. 1A and 1B.

This may be illustrated graphically as shown in FIG. 1C where $P_F$ probabilities are represented by a solid graph line with direction arrows, $P_B$ probabilities are represented by a dashed graph line with direction arrows, and the $T_L$ and $T_U$ thresholds are represented by dotted-and-dashed lines. As shown in FIG. 1C, the YHTC sequence is identified given that the $P_F$ probability of encountering Y is below $T_L$, the $P_F$ probability of encountering C is above $T_U$, the $P_B$ probability of encountering C is below $T_L$, and the $P_B$ probability of encountering Y is above $T_U$. Sequence boundaries may be seen at reference numerals 112 and 114 where the $P_F$ probability changes from above $T_U$ to below $T_L$, and where the $P_B$ probability changes from below $T_L$ to above $T_U$, where the $P_F$ and $P_B$ graph lines form an x-like crossing.

Referring now to FIG. 1B, a computer operations monitor 108 is configured to employ sequence detector 104 to identify, using BLSTM 102, candidate sequences of consecutive computer-executed operations within an evaluation set of consecutive computer-executed operations and in the same manner described hereinabove that was used to identify reference sequences 106. The evaluation set of consecutive computer-executed operations preferably includes computer operations that are executed subsequent to execution of the computer operations in the training set of computer-executed operations used by neural network manager 100 in FIG. 1A to train BLSTM 102, although the evaluation set of consecutive computer-executed operations may also be used by neural network manager 100 to train BLSTM 102 continuously. The evaluation set of consecutive computer-executed operations is preferably from the same computing perspective as the training set.

In one embodiment, computer operations monitor 108 is configured to designate an identified candidate sequence as anomalous if the candidate sequence is absent from reference sequences 106. In an alternative embodiment, computer operations monitor 108 is configured to designate a candidate sequence as anomalous if, in addition to the candidate sequence being absent from reference sequences 106, the probability $P_{FINAL}$ of encountering any given computer-executed operation within the candidate sequence is below a predetermined threshold $T_{FINAL}$, such as where $T_{FINAL}=0.2$.

In one embodiment, computer operations monitor 108 operates as described herein substantially concurrently with the execution of any of the computer-executed operations in the reference set, thereby enabling computer operations monitor 108 to designate a candidate sequence as anomalous substantially concurrently with the execution of the candidate sequence. In various embodiments computer operations monitor 108 is configured to perform one or more predefined computer security actions subsequent to designating a candidate sequence as anomalous, such as actions designed to protect a computer from malware or other malicious attack. Such computer security actions may include shutting down a computer that executes the anomalous sequence, alerting a computer user or system administrator to the presence of the anomalous sequence, and/or performing any other known computer security action.

Any of the elements shown in FIGS. 1A and 1B are preferably implemented by one or more computers in computer hardware and/or in computer software embodied in a non-transitory, computer-readable medium in accordance with conventional techniques, such as where any of the elements shown in FIGS. 1A and 1B are implemented by a computer 110.

Figure 2:
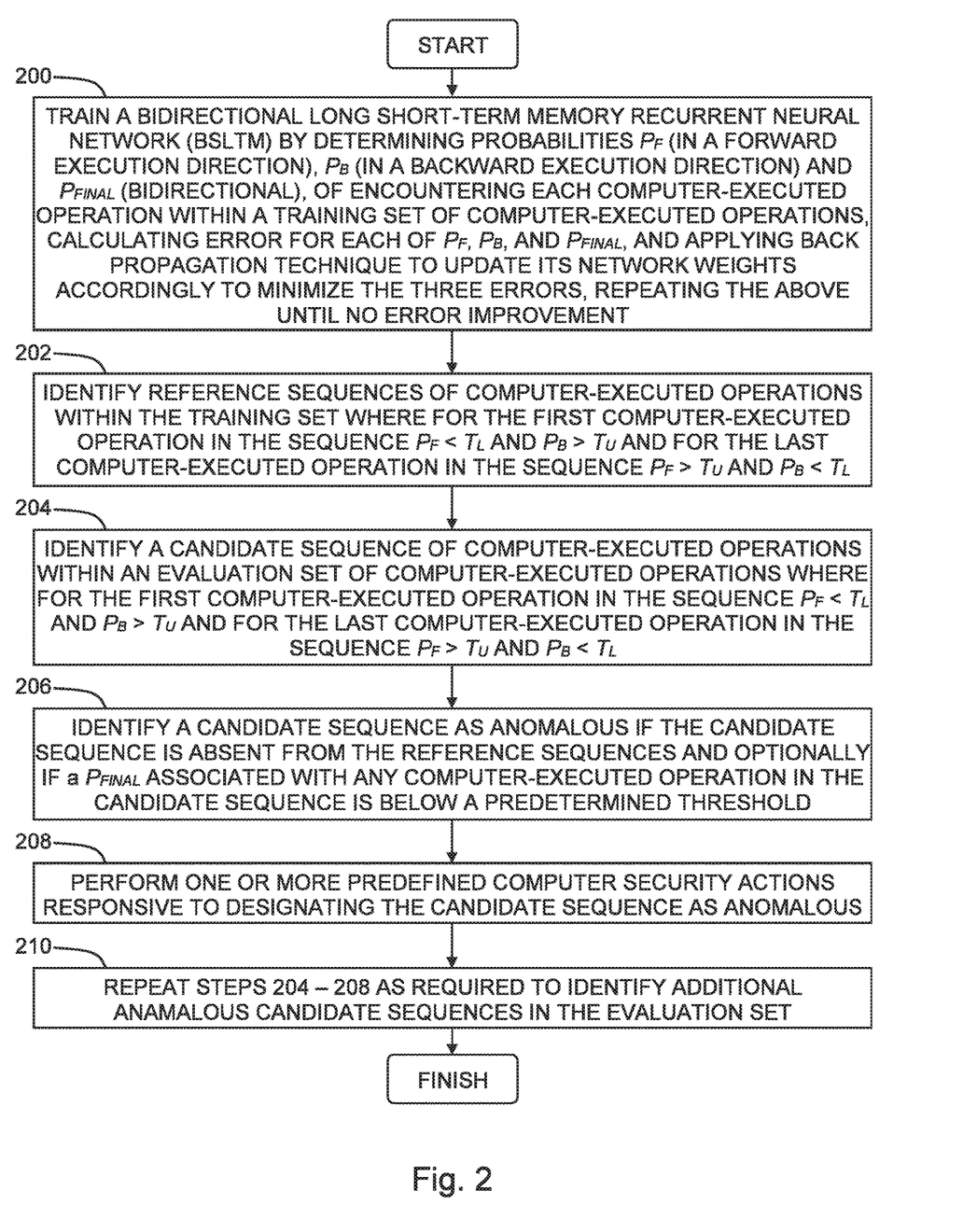
FIG. 2 is a simplified flowchart illustration of an exemplary method of operation of the system of FIGS. 1A and 1B, operative in accordance with an embodiment of the invention.

Reference is now made to FIG. 2 which is a simplified flowchart illustration of an exemplary method of operation of the system of FIGS. 1A and 1B, operative in accordance with an embodiment of the invention. In the method of FIG. 2, a bidirectional long short-term memory recurrent neural network (BSLTM) is trained with a training set of consecutive computer-executed operations (step 200), where for each given one of the computer-executed operations the BLSTM
- determines a forward probability $P_F$ of encountering the given computer-executed operation in a forward execution direction of the consecutive computer-executed operations in view of computer-executed operations executed prior to the given computer-executed operation,
- determines a backward probability $P_B$ of encountering the given computer-executed operation in a backward execution direction of the consecutive computer-executed operations in view of computer-executed operations executed subsequent to the given computer-executed operation,
- determines a probability $P_{FINAL}$ of encountering the given computer-executed operation in both forward and backward execution directions in view of computer-executed operations executed both prior to and subsequent to the given computer-executed operation
- calculates three errors, one for $P_F$, one for $P_B$, and one for $P_{FINAL}$, and
- applies backpropagation to update its network weights accordingly to minimize the three errors, which steps are preferably repeated one or more times until there is no improvement in the errors.

Reference sequences of consecutive computer-executed operations within the training set are identified using the BLSTM probabilities, where
- the probability $P_F$ of encountering the first computer-executed operation in the sequence in the forward execution direction of the set is below a predefined lower threshold $T_L$,
- the probability $P_F$ of encountering the last computer-executed operation in the sequence in the forward execution direction of the set is above a predefined upper threshold $T_U$,
- the probability $P_B$ of encountering the last computer-executed operation in the sequence in the backward execution direction of the set is below the lower threshold $T_L$, and
- the probability $P_B$ of encountering the first computer-executed operation in the sequence in the backward execution direction of the set is above the upper threshold $T_U$, where $T_L < T_U$ for any desired $T_L$ and $T_U$ (step 202). A candidate sequence of consecutive computer-executed operations is identified within an evaluation set of consecutive computer-executed operations where for the first computer-executed operation in the sequence $P_F < T_L$ and $P_B > T_U$ and for the last computer-executed operation in the sequence $P_F > T_U$ and $P_B < T_L$ (step 204). A candidate sequence is identified as anomalous if the candidate sequence is absent from the reference sequences and optionally if a probability $P_{FINAL}$ associated with any computer-executed operation in the candidate sequence is below a predetermined threshold (step 206). One or more predefined computer security actions are performed responsive to designating a candidate sequence as anomalous (step 208). Steps 204-208 may be repeated to identify additional candidate sequences in the evaluation set and determine whether they are anomalous (step 210).

Figure 3:
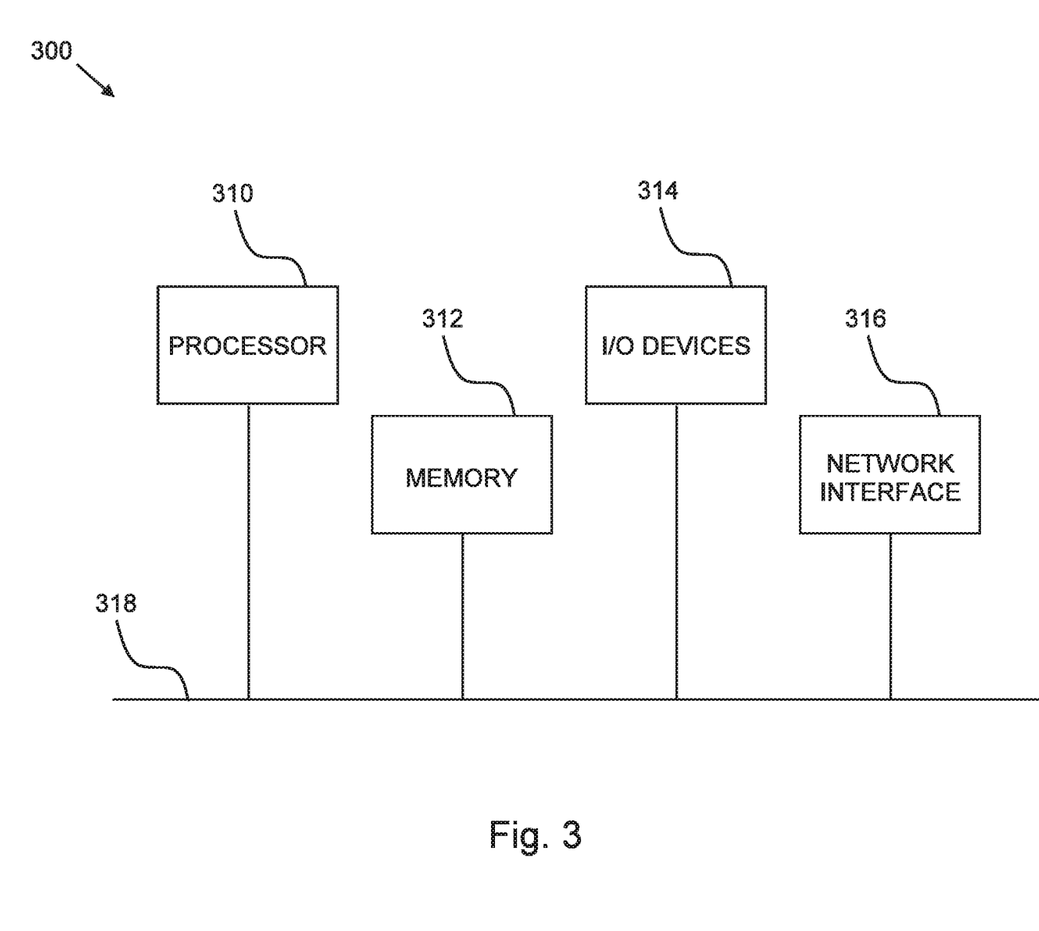
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1A-2) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   training a bidirectional long short-term memory recurrent neural network to determine probabilities of encountering each of a plurality of consecutive computer-executed operations within a training set of consecutive computer-executed operations, wherein for each of the computer-executed operations the probabilities include:
   a forward probability of encountering the computer-executed operation in a forward execution direction of the consecutive computer-executed operations, and a backward probability of encountering the computer-executed operation in a backward execution direction of the consecutive computer-executed operations;

identifying, using any of the forward probabilities and any of the backward probabilities, a plurality of reference sequences of consecutive computer-executed operations within the training set of consecutive computer-executed operations, wherein for each given one of the reference sequences:

the forward probability of encountering a first one of the computer-executed operations in the given reference sequence is below a predefined lower threshold, the forward probability of encountering a last one of the computer-executed operations in the given reference sequence is above a predefined upper threshold, the backward probability of encountering the last computer-executed operation in the given reference sequence is below the predefined lower threshold, the backward probability of encountering the first computer-executed operation in the given reference sequence is above the predefined upper threshold, and the predefined lower threshold is below the predefined upper threshold; and wherein the training comprises:

for each of the computer-executed operations, determining a probability $P_{FINAL}$ of encountering the respective computer-executed operation in view of other ones of the computer-executed operations that come before and after the respective computer-executed operation, calculating an error for each of the forward probability, the backward probability, and the probability $P_{FINAL}$, for any of the computer-executed operations, and applying a backpropagation algorithm to update network weights of the bidirectional long short-term memory recurrent neural network to minimize all the errors.

2. The method according to claim 1, further comprising:

identifying a candidate sequence of consecutive computer-executed operations within an evaluation set of consecutive computer-executed operations; and designating the candidate sequence as anomalous if the candidate sequence is absent from the reference sequences, wherein a probability of encountering a first computer-executed operation in the candidate sequence in a forward execution direction of the evaluation set is below the predefined lower threshold, wherein a probability of encountering a last computer-executed operation in the candidate sequence in the forward execution direction of the evaluation set is above the predefined upper threshold, wherein a probability of encountering the last computer-executed operation in the candidate sequence in a backward execution direction of the evaluation set is below the predefined lower threshold, and wherein a probability of encountering the first computer-executed operation in the candidate sequence in the backward execution direction of the evaluation set is above the predefined upper threshold.

3. The method according to claim 2, wherein:

the designating comprises designating the candidate sequence as anomalous if, in addition to the candidate sequence being absent from the reference sequences, the probability $P_{FINAL}$ of encountering any given one of the computer-executed operations within the candidate sequence is below a predetermined threshold.

4. The method according to claim 2, wherein the designating is performed concurrently with execution of any of the computer-executed operations of the evaluation set.

5. The method according to claim 2, wherein the training set and the evaluation set are of computer-executed operations performed by a computer software application.

6. The method according to claim 2, wherein the training set and the evaluation set are of computer-executed operations performed by a first computer in support of interactions with a second computer.

7. A system comprising:

(a) at least one processor; and (b) a non-transitory computer-readable storage medium having program code embodied therewith, the program code executable by the at least one processor to:

train a bidirectional long short-term memory recurrent neural network to determine probabilities of encountering each of a plurality of consecutive computer-executed operations within a training set of consecutive computer-executed operations, wherein for each of the computer-executed operations the probabilities include:

a forward probability of encountering the computer-executed operation in a forward execution direction of the consecutive computer-executed operations, and a backward probability of encountering the computer-executed operation in a backward execution direction of the consecutive computer-executed operations, and identify, using any of the forward probabilities and any of the backward probabilities, a plurality of reference sequences of consecutive computer-executed operations within the training set of consecutive computer-executed operations, wherein for each given one of the reference sequences:

the forward probability of encountering a first one of the computer-executed operations in the given reference sequence is below a predefined lower threshold, the forward probability of encountering a last one of the computer-executed operations in the given reference sequence is above a predefined upper threshold, the backward probability of encountering the last computer-executed operation in the given reference sequence is below the predefined lower threshold, the backward probability of encountering the first computer-executed operation in the given reference sequence is above the predefined upper threshold, and the predefined lower threshold is below the predefined upper threshold; and wherein the training comprises:

for each of the computer-executed operations, determining a probability $P_{FINAL}$ of encountering the respective computer-executed operation in view of other ones of the computer-executed operations that come before and after the respective computer-executed operation, calculating an error for each of the forward probability, the backward probability, and the probability $P_{FINAL}$, for any of the computer-executed operations, and applying a backpropagation algorithm to update network weights of the bidirectional long short-term memory recurrent neural network to minimize all the errors.

8. The system according to claim 7, wherein the program code is further executable to:
employ a sequence detector to identify a candidate sequence of consecutive computer-executed operations within an evaluation set of consecutive computer-executed operations; and
designate the candidate sequence as anomalous if the candidate sequence is absent from the reference sequences,
wherein a probability of encountering a first computer-executed operation in the candidate sequence in a forward execution direction of the evaluation set is below the predefined lower threshold,
wherein a probability of encountering a last computer-executed operation in the candidate sequence in the forward execution direction of the evaluation set is above the predefined upper threshold,
wherein a probability of encountering the last computer-executed operation in the candidate sequence in a backward execution direction of the evaluation set is below the predefined lower threshold, and
wherein a probability of encountering the first computer-executed operation in the candidate sequence in the backward execution direction of the evaluation set is above the predefined upper threshold.

9. The system according to claim 8, wherein:
the designating comprises designating the candidate sequence as anomalous if, in addition to the candidate sequence being absent from the reference sequences, the probability $P_{FINAL}$ of encountering any given one of the computer-executed operations within the candidate sequence is below a predetermined threshold.

10. The system according to claim 8, wherein the designating is performed concurrently with execution of any of the computer-executed operations of the evaluation set.

11. The system according to claim 8, wherein the training set and the evaluation set are of computer-executed operations performed by a computer software application.

12. The system according to claim 9, wherein the training set and the evaluation set are of computer-executed operations performed by a first computer in support of interactions with a second computer.

13. A computer program product comprising:
a non-transitory, computer-readable storage medium; and
computer-readable program code embodied in the storage medium, wherein the computer-readable program code is executable by at least one processor to:
train a bidirectional long short-term memory recurrent neural network to determine probabilities of encountering each of a plurality of consecutive computer-executed operations within a training set of consecutive computer-executed operations, wherein for each of the computer-executed operations the probabilities include:
a forward probability of encountering the computer-executed operation in a forward execution direction of the consecutive computer-executed operations, and
a backward probability of encountering the computer-executed operation in a backward execution direction of the consecutive computer-executed operations, and identify, using any of the forward probabilities and any of the backward probabilities, a plurality of reference sequences of consecutive computer-executed operations within the training set of consecutive computer-executed operations, wherein for each given one of the reference sequences:
the forward probability of encountering a first one of the computer-executed operations in the given reference sequence is below a predefined lower threshold,
the forward probability of encountering a last one of the computer-executed operations in the given reference sequence is above a predefined upper threshold,
the backward probability of encountering the last computer-executed operation in the given reference sequence is below the predefined lower threshold,
the backward probability of encountering the first computer-executed operation in the given reference sequence is above the predefined upper threshold, and
wherein the predefined lower threshold is below the predefined upper threshold, and
wherein the computer-readable program code comprises a neural network manager configured to train the bidirectional long short-term memory recurrent neural network by:
for each of the computer-executed operations, determining a probability $P_{FINAL}$ of encountering the respective computer-executed operation in view of other ones of the computer-executed operations that come before and after the respective computer-executed operation,
calculating an error for each of the forward probability, the backward probability, and the probability $P_{FINAL}$, for any of the computer-executed operations, and applying a backpropagation algorithm to update network weights of the bidirectional long short-term memory recurrent neural network to minimize all the errors.

14. The computer program product according to claim 13, wherein the computer-readable program code is further executable to:
identify a candidate sequence of consecutive computer-executed operations within an evaluation set of consecutive computer-executed operations; and
designate the candidate sequence as anomalous if the candidate sequence is absent from the reference sequences,
wherein a probability of encountering a first computer-executed operation in the candidate sequence in a forward execution direction of the evaluation set is below the predefined lower threshold,
wherein a probability of encountering a last computer-executed operation in the candidate sequence in the forward execution direction of the evaluation set is above the predefined upper threshold,
wherein a probability of encountering the last computer-executed operation in the candidate sequence in a backward execution direction of the evaluation set is below the predefined lower threshold, and
wherein a probability of encountering the first computer-executed operation in the candidate sequence in the backward execution direction of the evaluation set is above the predefined upper threshold.

15. The computer program product according to claim 14, wherein:
- the designating comprises designating the candidate sequence as anomalous if, in addition to the candidate sequence being absent from the reference sequences, the probability $P_{FINAL}$ of encountering any given one of the computer-executed operations within the candidate sequence is below a predetermined threshold.

16. The computer program product according to claim 14, wherein the designating is performed concurrently with execution of any of the computer-executed operations of the evaluation set.

17. The computer program product according to claim 14, wherein the training set and the evaluation set are of computer-executed operations performed by a computer software application.

\* \* \* \* \*